US006985414B2

(12) United States Patent
Rogers et al.

(10) Patent No.: US 6,985,414 B2
(45) Date of Patent: Jan. 10, 2006

(54) METHOD AND APPARATUS FOR WRITING ON AN OPTICAL DISK WITH BEAM SPOTS ALIGNED AT AN ANGLE TO DATA TRACKS

(75) Inventors: Steven R. Rogers, D.N. Emek Sorek (IL); Alexander Libinson, Holon (IL)

(73) Assignee: Dragsholm Wireless Holdings LLC, Las Vegas, NV (US)

( * ) Notice: Subject to any disclaimer, the term of this patent is extended or adjusted under 35 U.S.C. 154(b) by 327 days.

(21) Appl. No.: 10/042,653

(22) Filed: Jan. 8, 2002

(65) Prior Publication Data

US 2003/0012113 A1    Jan. 16, 2003

Related U.S. Application Data

(60) Provisional application No. 60/260,468, filed on Jan. 8, 2001.

(51) Int. Cl.
*G11B 7/00* (2006.01)

(52) U.S. Cl. .................................... 369/44.38; 369/116

(58) Field of Classification Search .................. 369/95, 369/275.4, 59.12, 44.38, 116
See application file for complete search history.

(56) References Cited

U.S. PATENT DOCUMENTS

| | | | | |
|---|---|---|---|---|
| 4,001,493 | A | | 1/1977 | Cone |
| 4,283,777 | A | | 8/1981 | Curry et al. |
| 4,298,974 | A | | 11/1981 | Tsunoda et al. |
| 4,520,472 | A | * | 5/1985 | Reno ..................... 369/112.24 |
| 4,703,408 | A | | 10/1987 | Yonezawa et al. |
| 4,754,446 | A | | 6/1988 | Reno |
| 4,841,514 | A | | 6/1989 | Tsuboi et al. |
| 4,972,396 | A | | 11/1990 | Rafner |
| 5,105,407 | A | | 4/1992 | Ishika |
| 5,208,792 | A | * | 5/1993 | Imanaka .................. 369/44.38 |
| 5,239,529 | A | | 8/1993 | Tobita et al. |
| 5,365,535 | A | | 11/1994 | Yamaguchi et al. |
| 5,428,974 | A | | 7/1995 | Shinohara |
| 5,457,670 | A | | 10/1995 | Maeda et al. |
| 5,465,243 | A | | 11/1995 | Boardman et al. |
| 5,483,511 | A | | 1/1996 | Jewell et al. |
| 5,485,438 | A | | 1/1996 | Koyama |
| 5,508,990 | A | | 4/1996 | Nagasaki et al. |
| 5,583,836 | A | | 12/1996 | Rokutan et al. |
| 5,592,444 | A | | 1/1997 | Alon et al. |

(Continued)

FOREIGN PATENT DOCUMENTS

EP    0 388 760 A1    9/1990

(Continued)

OTHER PUBLICATIONS

JP 04 069818 from *Patent Abstracts of Japan* vol. 16 No. 272: p. 1373 (Jun. 18, 1992).

(Continued)

*Primary Examiner*—Gautam R. Patel
(74) *Attorney, Agent, or Firm*—Townsend and Townsend and Crew LLP

(57) ABSTRACT

Data is written on a plurality of data tracks on an optical disk by a plurality of laser beams. The spots illuminated by the beams are spaced apart to prevent thermal interference. The spots are aligned along a line at an angle to the tangent of the data tracks. The angle of the line of spots is determined by an equation using variables that include the track pitch, the minimum distance between spots and the difference in track numbers between tracks being written.

13 Claims, 4 Drawing Sheets

U.S. PATENT DOCUMENTS

| | | | | |
|---|---|---|---|---|
| 5,594,711 | A * | 1/1997 | Koyama | 369/44.37 |
| 5,625,388 | A * | 4/1997 | Maeda et al. | 346/135.1 |
| 5,691,862 | A * | 11/1997 | Hashimoto | 360/244 |
| 5,818,811 | A * | 10/1998 | Fujii | 369/275.4 |

FOREIGN PATENT DOCUMENTS

| | | |
|---|---|---|
| EP | 0 588 575 | 3/1994 |
| EP | 0 630 002 A1 | 12/1994 |
| EP | 0 701 251 | 3/1996 |
| WO | WO 94/19796 | 9/1994 |

OTHER PUBLICATIONS

JP 02 179937 from *Patent Abstracts of Japan* vol. 14 No. 452: p. 1112 (Sep. 27, 1990).

JP 60 212838 from *Patent Abstracts of Japan* vol. 10 No. 074: p. 0439 (Mar. 25, 1986).

* cited by examiner

METHOD AND APPARATUS FOR WRITING ON AN OPTICAL DISK WITH BEAM SPOTS ALIGNED AT AN ANGLE TO DATA TRACKS

This application claims benefit of provisional application No. 60/260,468, filed on Jan. 8, 2001.

FIELD OF THE INVENTION

The present invention relates to optical disk drives which can read and write optical disks. More specifically, the present invention provides a multi-beam optical system for simultaneously writing multiple tracks of an optical disk.

BACKGROUND OF THE INVENTION

Current writable optical disk technologies include several write-once technologies, such as CD-Recordable (CD-R) and DVD-Recordable (DVD-R), as well as re-writeable technologies, such as CD-Re-writeable (CD-RW), DVD Re-writeable (DVD-RW), and DVD-RAM.

Data is typically recorded on writeable optical disks by using a writing beam having a higher power than is used for reading. The media for use with optical disk writers typically includes a recording layer, made of a material which changes its optical characteristics in response to the presence of the beam from the high power laser. The high power laser is used to create "pits" in the recording layer which have a different reflectivity than surrounding areas of the disk, and which can be read using a lower power reading beam.

Because in most previously known optical disk systems the data are read from or written to the disk serially, i.e. one bit at a time, the maximum data transfer rate for an optical disk reader is determined by the rate at which the pits pass by the pickup assembly. Because the linear density of the bits and the track pitch are fixed by the specification of the particular optical disk format, the data transfer rate of optical disk readers is limited by the rotational speed of the disk itself. However, high disk rotational speeds place increased demands on the optical and mechanical subsystems within the optical disk player, create greater vibration, and may make such players more difficult and expensive to design and manufacture.

Furthermore, in recording systems, the minimum energy required to form a mark of a given length is determined by the chemical and thermal properties of the recording disk medium. The laser energy impinging on the mark area is proportional to laser power and inversely proportional to disk rotational speed. Thus, for a given laser power, there is a practical upper limit to the disk rotational speed during recording.

A cost effective alternative to increasing the disk rotational speed to provide faster optical disk drives is to read or write multiple data tracks simultaneously, as described in commonly assigned U.S. Pat. No. 5,426,623 to Alon et al. In accordance with the methods and apparatus provided therein, for example, ten adjacent data tracks may be read simultaneously. Thus, even if the disk is rotated at only 8× the standard speed, the capability to read ten tracks simultaneously provides the equivalent of a 80× drive.

It would therefore be desirable to provide an optical drive that achieves improved writing speeds by writing data to multiple tracks of an optical disk simultaneously.

SUMMARY OF THE INVENTION

An optical disk system constructed in accordance with the present invention preferably employs a number of laser diodes capable of operating at selectable power levels to generate: a low power light beam in a read mode of operation, a high power light beam in a write mode of operation, and an intermediate power light beam in an erase mode of operation. An optical pickup directs the light beams from the multiple laser diodes to the corresponding tracks of the optical disk, ensuring the light beams are in focus and tracking the proper tracks. The beams are properly spaced apart to prevent interference between data written by the multiple beams. A processor, either a specially programmed general purpose processor or an application specific integrated circuit, controls the power supplied to the laser diodes according to the selected mode.

BRIEF DESCRIPTION OF THE DRAWINGS

Further features of the invention, its nature and various advantages will be more apparent from the accompanying drawings and the following detailed description of the preferred embodiments, in which.

DETAILED DESCRIPTION OF THE INVENTION

Figure 1:
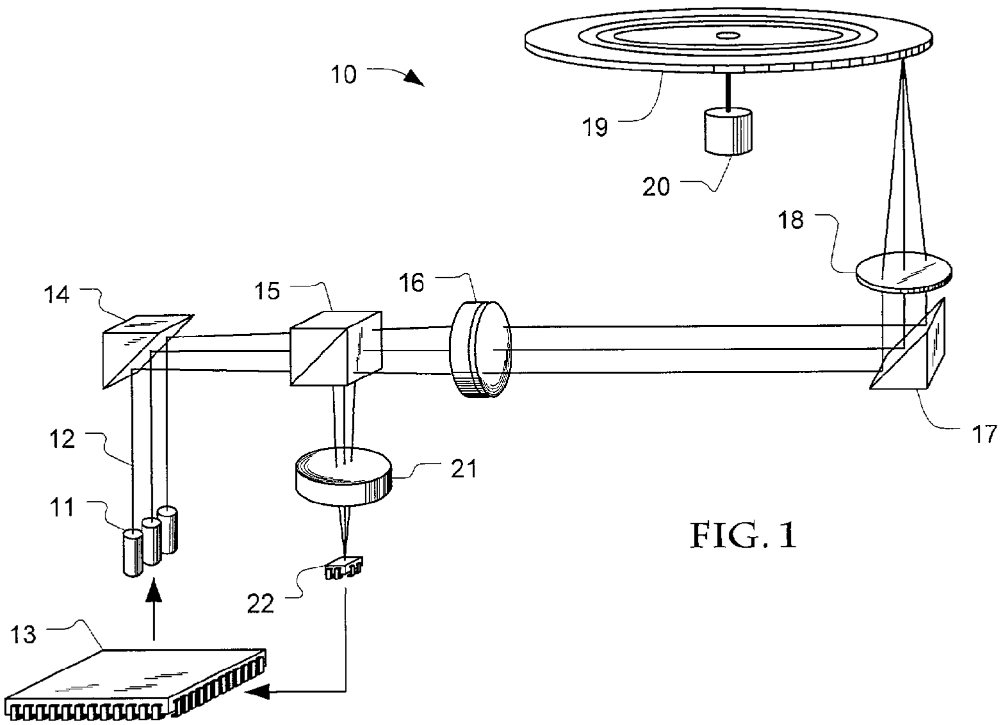
FIG. 1 is a schematic block diagram of a optical disk drive using multiple beams to read and write multiple tracks of an optical disk simultaneously.

Referring to FIG. 1, multibeam optical disk drive 10 is described. Laser diodes 11*a–c* generate illumination beams 12*a–c*. Beams 12*a–c* are reflected by prism mirror 14 and pass through beam splitter 15. Beams 12*a–c* are then collimated by lens 16 and reflected by mirror 17 toward objective 18, which focuses the beams onto a surface of optical disk 19. Because the severity of aberrations introduced by the optical components shown in FIG. 1 increase with a beams distance from the optical axis of the component, it is desirable to minimize the spacing between beams 12*a–c*. Motor 20 spins optical disk 19, and various servo systems and actuators move one or more of the components of FIG. 1 to access different areas of optical disk 19, and to keep beams 12*a–c* focused on, and in alignment with, the appropriate tracks of optical disk 19.

Beams 12*a–c* are reflected from a data-bearing structure in optical disk 19 and modulated by the data recorded there. The reflected, modulated beams again pass through objective 18 and are directed back to collimator 16 and beam splitter 15 by mirror 17. Beam splitter 15 directs the returning beams through lens 21 onto detector 22, having a plurality of photo-detector elements. Each photo-detector element detects the modulation of a corresponding reflected light beam and produces a corresponding electrical signal. Processing circuitry 13 extracts data from the signals to read the data from a track of the optical disk. Processing circuitry 13 also modulates laser diodes 11_a–c_ when writing to optical disk 19. Additional signals output by detector 22 may be used to detect errors in the focus and tracking of the optical disk drive.

A multi-beam optical disk drive, as described above, is capable of achieving very high speeds when reading an optical disk. A seven beam reader, for example, which rotates the disk at 10× standard speed, would provide a data rate equivalent to a 70× drive. Thus, simultaneously reading multiple tracks of an optical disk provides significant increases in data reading rates at relatively low spindle speeds, as compared to optical systems that read a single track.

It should be noted that as used herein, a data track is a portion of the spiral data track of a typical optical disk which follows the spiral for one rotation of the disk. Thus, a drive capable of reading multiple data tracks simultaneously reads several such portions of the spiral data track at once. For disks having multiple concentric spiral tracks, a data track would refer to a corresponding portion of one of the concentric spiral tracks. For optical disks having concentric circular tracks, a data track would refer to one such circular track.

In addition, simultaneously is used to mean concurrently, although not necessarily starting and stopping at the same time. So, for example, writing two tracks simultaneously means that at some time two tracks are being written at the same instant even though writing did not start or end at the same time for both tracks.

The laser diode used in an optical disk writer is capable of generating a higher power beam than the laser diode of an optical disk reader. For example, while reading may require a light beam having a power of 0.5 mW, writing data to an optical disk may require a light beam having a power in the range of 12 to 14 mW, depending upon the specific optical disk technology employed. Many optical disk writers also may produce a light beam having an intermediate power used to erase areas of the writeable optical media. Such a light beam may, for example, have a power of 10 mW. The power of the beam is modulated to selectively read, erase, and write corresponding pits on the optical disk that may be subsequently read by an optical disk reader.

In accordance with the present invention, a multi-beam optical disk reader is provided that is capable of simultaneously reading multiple tracks of data during a read mode of operation and which is also capable of writing multiple tracks of data during a write mode of operation.

It is assumed during the following description that optical disk 19 is a re-writeable optical disk, such a DVD-RAM, or DVD-RW disk. It will be apparent from the following description, however, that optical disk 19 also may be, for example, a CD-ROM or DVD-ROM disk, where it is desired to use only the read mode of operation of the optical system.

Processor 13, which may be a suitably programmed general purpose microprocessor or digital application-specific integrated circuit, determines whether the optical system is to operate in read mode or write mode, and issues commands to adjust the power supplied to laser diodes 11_a–c_. Accordingly, when multiple tracks are being read during read mode, processor 13 causes laser diodes 11_a–c_ all to be continuously energized to produce light beams with sufficient power to permit reading multiple tracks on optical disk 19. During the write mode of operation, when data is being written to optical disk 19, processor 13 causes laser diodes 11_a–c_ to output beams with sufficiently high power for writing data to optical disk 19, modulated according to the data being written. If desired, processor 13 may also provide an erase mode of operation, for use with re-writable optical media such as DVD-RAM disks.

Optical storage systems, such as CD and DVD, rely on the geometry of marks on the optical media for proper operation. For example, data is encoded by the length and spacing of the marks; whereas tracking relies on the width and symmetry of the marks. It is therefore critical that marks on optical media have the proper size and shape. This presents some problems when writing multiple beams simultaneously.

The shape of written marks depends on the temperature profile during writing and the specific temperature thresholds for writing and erasing (in the case of RW media) of the optical media. The temperature profile during writing depends, in turn, on the energy distribution of the laser beam and the thermal conductivity of the media. The latter depends on the composition and layer structure of the media.

CD-R type disks have a dye layer and a metal layer sandwiched between two polycarbonate layers. When writing to a CD-R, a laser beam focused on the metal layer causes localized heating in the surrounding materials. This raises the temperature to approximately 600° C., causing an irreversible chemical change of the dye. Areas in which the dye has been changed reflect reading beams differently than areas in which the dye has not been heated, enabling the data to be read.

A CD-RW or DVD-RW has a slightly more complex structure, including an outer polycarbonate layer, and a writing structure including a protective layer, an active layer, another protective layer, and a metal layer. When writing to such a disk a reversible changes in the active layer is used to record the data. A common active layer is made of a Ge—Sb—Te material which undergoes a phase change when heated. An amorphous mark is made by heating the material to 600° C. followed by rapid cooling. The mark is "erased" by heating to a temperature of about 200° C.$<T_{erase}<$600° C., which changes the material back from an amorphous to a crystalline form. The amorphous and crystalline forms possess sufficiently different optical properties that an optical disk reader is able to read data previously written to the disk.

For current types of recordable media, writing occurs at about the same temperature, e.g., 600° C., and deviations from the ideal writing temperature produce similar results. As noted above, the size and shape of the pits or marks recorded on an optical disk is critical to the proper operation of an optical disk drive. Heat from a writing beam diffuses through the volume of an optical disk so that heating is not limited to areas directly illuminated by the writing beam. If the diffused heating is sufficient to cause changes in the recording layer away from the writing beam, the resulting marks may be oversized or misshapen, and may not be readable by an optical disk reader.

The amount of diffuse heating depends on the structure of the disk, the thermal diffusion coefficient (DT) of the materials in the disk, and the length of time heat is applied. Typical re-writeable media have active and protective layer approximately 0.01 to 0.1 mm thick and an outer plastic layer of about ~1 mm. The effective value of thermal diffusion coefficient depends on the actual multi-layer structure of the specific optical disk media, but for typical media, it is on the order of approximately $10^{-2}$ $cm^2$/sec.

The typical writing time for one mark is about 100 nsec. During this time, the radius of the thermal diffusion zone is about 0.3 $\mu$m as given by Equation (1).

$$\sqrt{DT\times t} \quad (1)$$

Where DT is the coefficient of thermal diffusion, and t it the time. The size of the thermal diffusion zone effectively puts a lower bound on how close together adjacent marks can be written. For example, the writing of a given pit is highly influenced by the temperature distribution within the disk, which spreads out from the previously written pit as described in "Ten-Year Overview and Future Prospects of Write-Once Organic Recordable Media", by E. Hamada, Y. Takaguchi et al, Japanese Journal of Applied Physics, v.39 (2000), pp.785–788. Part 1, No.2B. The corresponding safe distance between the end of a previous pit and the beginning of a pit being written is referred to as "the minimum inter-pit interval" (MIPI). As an example, the MIPI for a CD-R is 0.83 $\mu$m, whereas the MIPI for a DVD-R is 0.4 $\mu$m. Ongoing developments in optical disk technologies promise finer track pitches, and correspondingly smaller MIPIs, in the future.

Under typical conditions, the inter-pit spacing on an optical disk is greater than the MIPI given by the Hamada article, and diffuse heating due to a single writing beam is not sufficient to cause adverse changes in areas surrounding a pit being written. However, this is not true when writing with multiple beams. Because the radius of the thermal diffusion zone is approximately the same order of magnitude as the track pitch of typical optical disks, writing on adjacent tracks might deteriorate the shape of written marks due to mutual influence of their temperature distributions.

An approximation for the minimal distance needed between simultaneously written marks on adjacent tracks, may be estimated from temperature distribution in the optical disk immediately following a write operation. The temperature profile may be approximated by the Green's function for a point source of heat on a two-dimensional surface, given in Equation (2).

$$T(x) \propto G(x, t) = \left(\frac{2}{\pi\tau}\right)e^{\left(\frac{-x^2}{\tau}\right)} \quad (2)$$

Where T(x) is the temperature distribution at the end of a 100 nsec writing pulse; x is the radial distance from the center of the mark; $\tau=4\times DT\times t$; and t=100 nsec.

Figure 2:
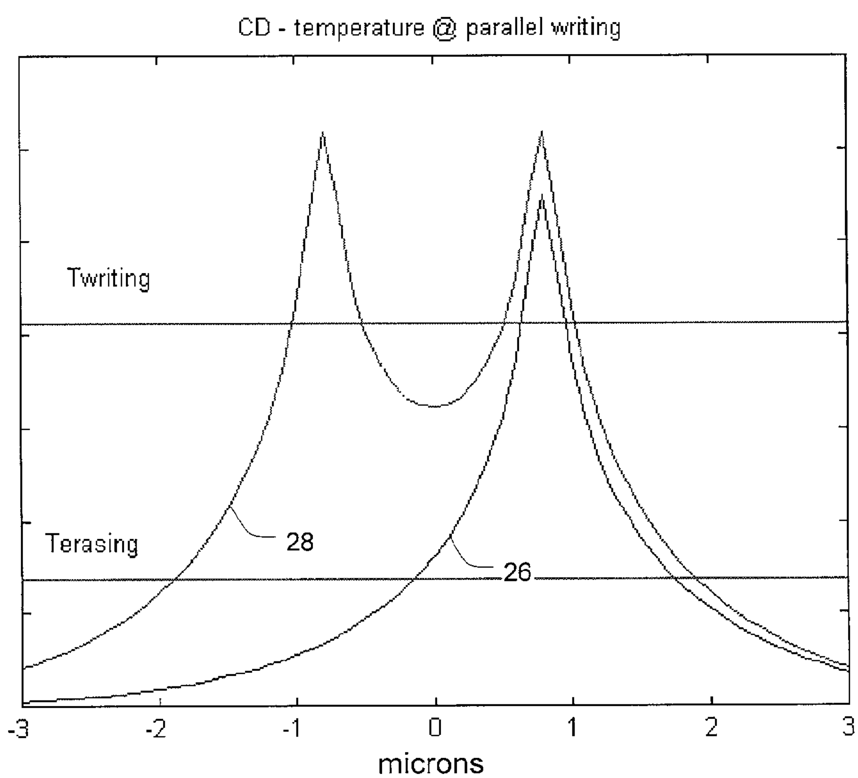
FIG. 2 shows illustrative temperature profiles when writing to a CD-RW type optical disk with one and two writing beams.

The resulting temperature distribution has a shape like that of curve 26 of FIG. 2. As shown, the temperature peaks well above 600° C. at the center of the writing beam, and gradually diminishes with distance. When two point sources are used to write simultaneously on adjacent tracks separated by a distance, d, the resultant temperature distribution can be estimated by superposing two Green's functions as shown in Equation (3). The resulting temperature distribution has a shape like that of curve 28 of FIG. 2

$$G2(x, t) = G\left(x - \frac{d}{2}, t\right) + G\left(x + \frac{d}{2}, t\right) \quad (3)$$

Figure 4:
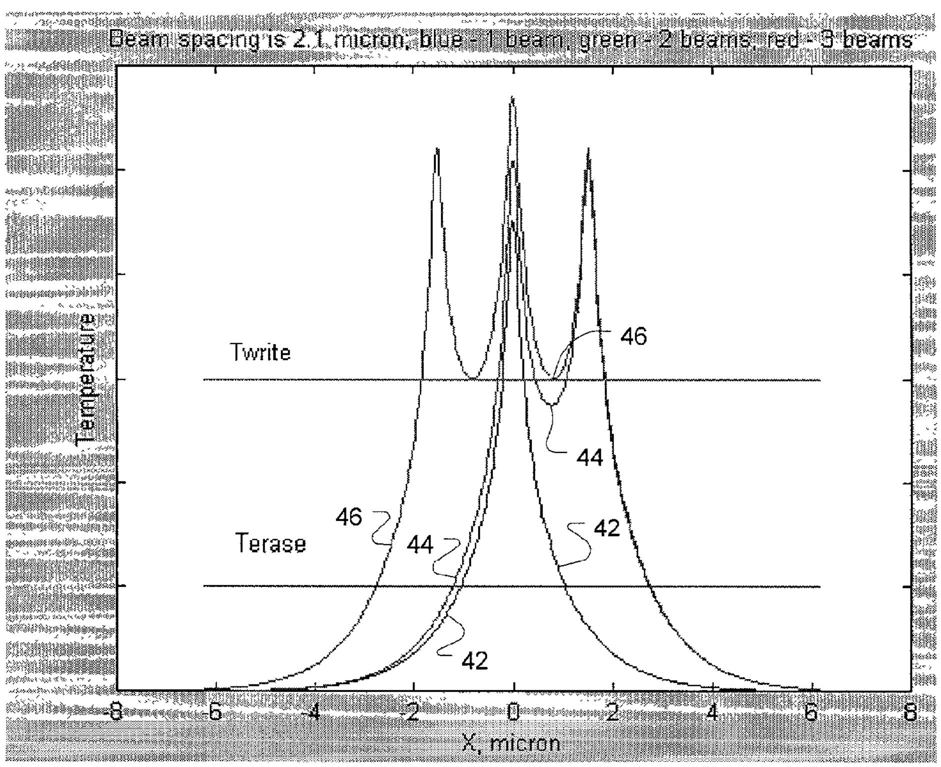
FIG. 4 shows illustrative temperature profiles when writing to a DVD-RW type optical disk with up to three writing beams.

For a typical CD-type optical disk the resulting temperature profile is shown in FIG. 4, in which curve 42 corresponds to writing a single track, and curve 44 corresponds to writing on two adjacent tracks simultaneously. As shown, when two writing beams are spaced at the track pitch of CD media, e.g., at about 1.6 microns, the portion of curve 44 for which T>Twriting is broader than it is for curve 42. This means that the written marks are broader when writing with two beams than when writing with one beam. Also of note is that the increase in pit width is not symmetrical about the track centerline. This in turn may adversely impact the tracking ability of an optical disk reader. Moreover, wider pits may result in increased crosstalk between adjacent tracks.

Figure 3:
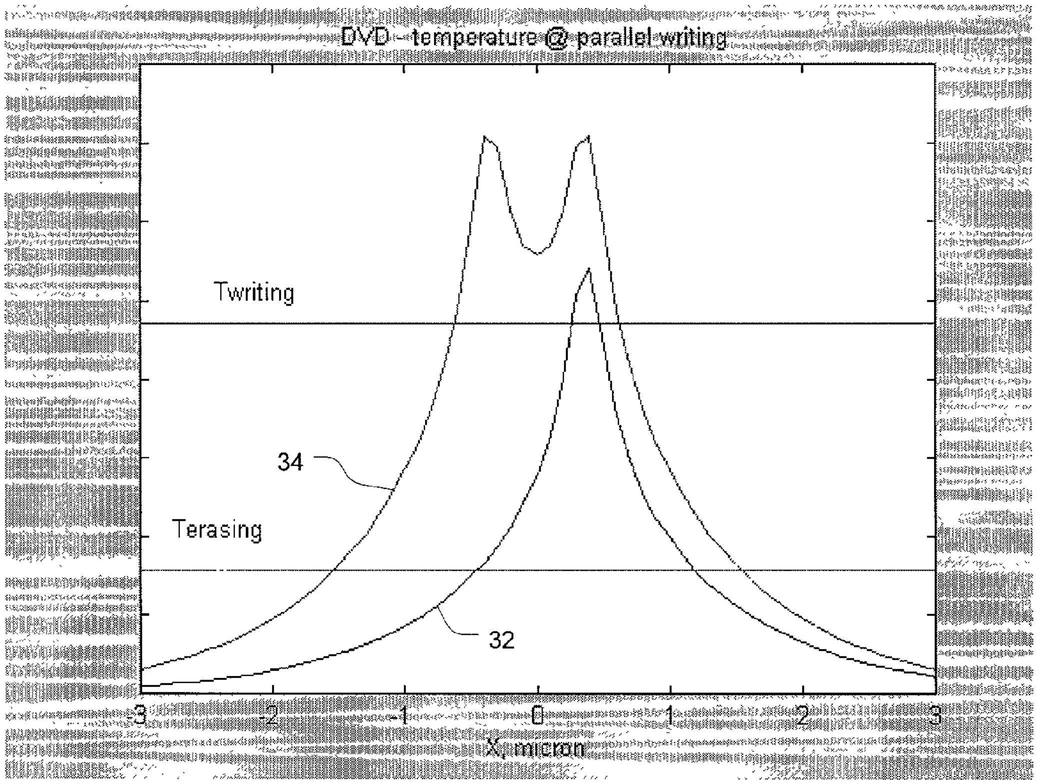
FIG. 3 shows illustrative temperature profiles when writing to a DVD-RW type optical disk with one and two writing beams.

The situation is worse for DVD-type media. As shown in FIG. 3, when two beams are spaced at approximately 0.74 microns, which is the track pitch of DVD media, the two written marks actually coalesce into one large mark. This is an extreme case of the interference that can occur when two write beams are writing in very close proximity.

The effects of using more than two write beams is shown in FIG. 4, wherein three write beams are spaced 2.1 um apart, e.g. approximately triple the track pitch of a DVD-type optical disk. As shown in curve 46, the resulting pit spans nearly 4.0 um, or five times the track pitch. The distribution shown in FIG. 4 can be determined from Equation (4), which is the superposition of three Green's functions.

$$G3(x,t)=G(x-d,t)+G(x,t)+G(x+d,t) \quad (4)$$

Figure 5:
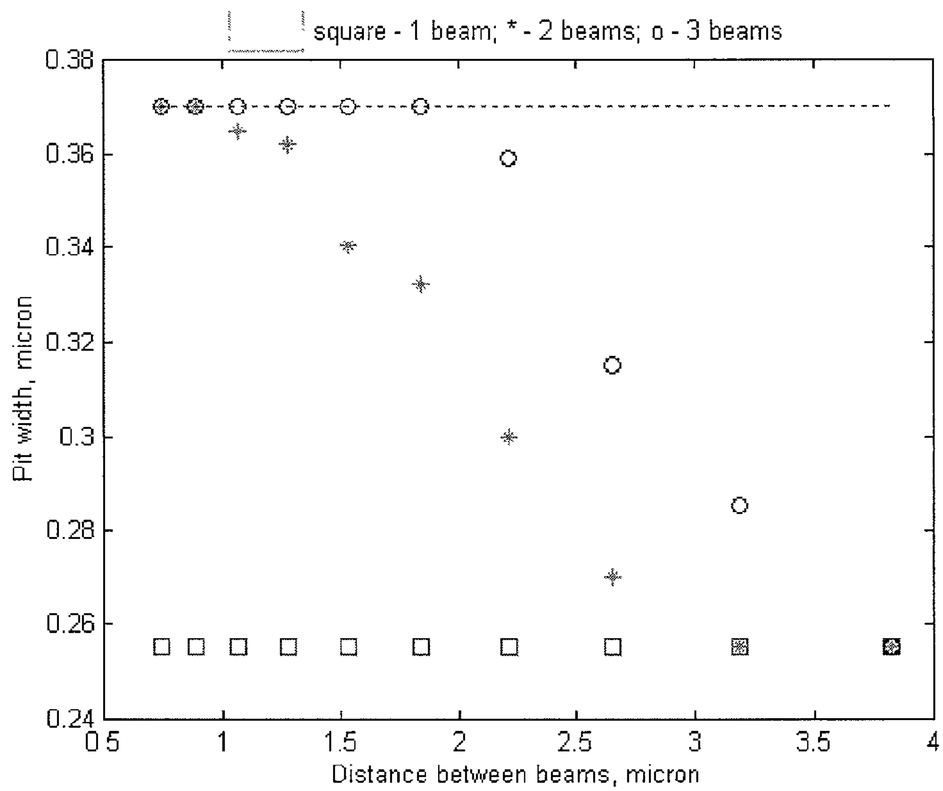
FIG. 5 shows the effect of write beam spacing on pit width.

FIG. 5 shows a plot of pit size versus beam spacing for one, two, or three writing beams. From this graph it can be determined that a minimum spacing of about 3.8 $\mu$m is needed so that the width of a pit when writing with three beams is the same size as when writing with a single beam. When using more than three writing beams, e.g., 5 or 7 beams, the minimum spacing will be larger than 3.8 $\mu$m. However, the difference should be small because the effect of the beams diminishes quickly with distance from the central beam.

The astute reader will realize that the calculations presented above disregard the time-dependent effects caused by rotation of the optical disk. However, the figures are in good qualitative agreement with the results of more detailed calculations, which do take into account the time-dependent energy distributions for rotating disc media.

Figure 6:
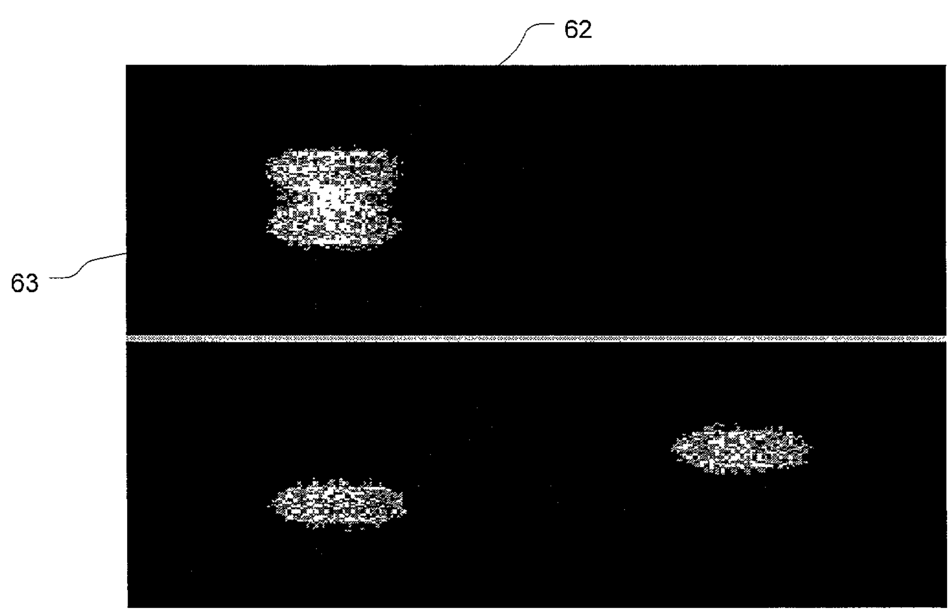
FIG. 6 shows the results of a simulation of writing pits on adjacent tracks of an optical disk.

FIG. 6 shows the results of a 3D simulation of heat propagation on a typical DVD. The simulation used typical disk layer structure, laser power levels, and relative motion between the disk and writing beams. Lighter shades indicate higher peak temperatures. The top image shows the result of writing to two adjacent tracks, wherein the writing beams are side by side. As can be seen in the top image, nearby pits can merge if beam separation is inadequate. The bottom image shows the result when the writing means are aligned at an angle to the tracks to provide adequate separation.

Figure 7:
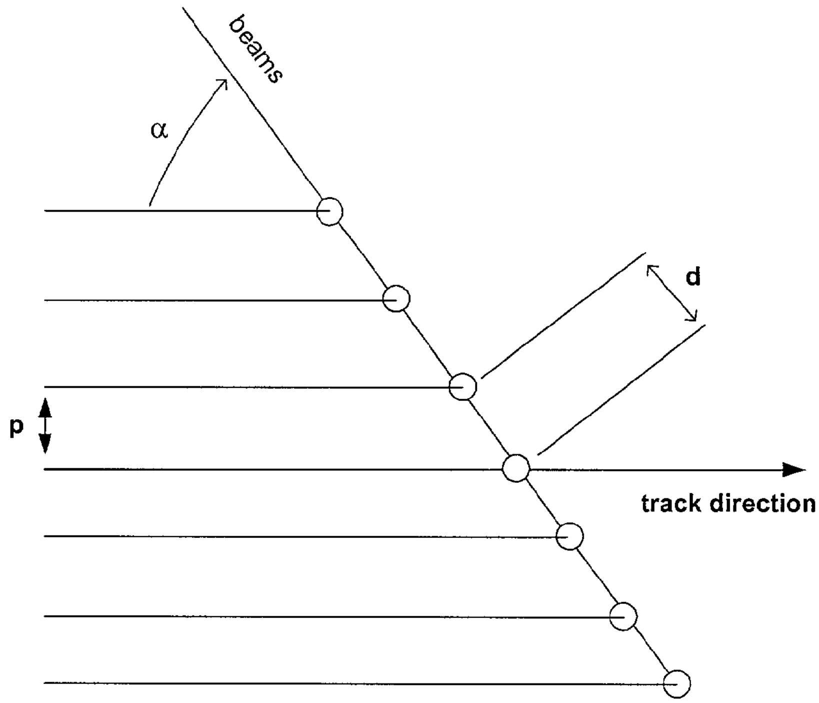
FIGS. 7 and 8 show illustrative write beam geometries that prevent interference between pits when writing to nearby tracks.
Figure 8:
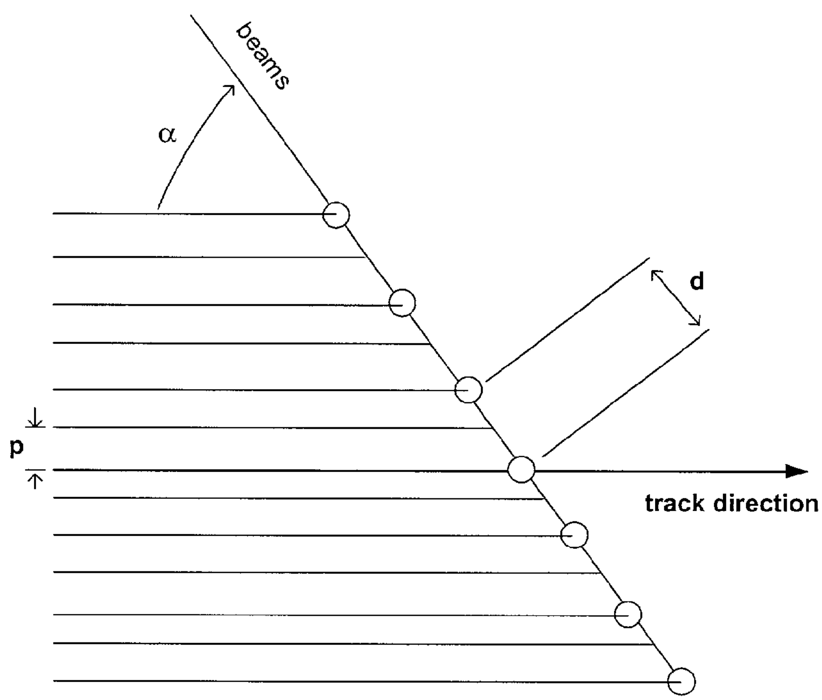

Because the minimum beam spacing exceeds the track pitch of a typical optical disk, it is necessary in multibeam writing to dispose the beams so that they are spaced apart at a sufficiently large distance to prevent thermal interference. One technique is to line the beams up at an angle to the tracks as shown in FIGS. 7 and 8, wherein the angle a of the beam axis with respect to the track tangent satisfies the condition given in Equation (5).

$$\sin\alpha = k\frac{p}{d} \quad (5)$$

where p is the track pitch, d is the desired spacing between adjacent writing beams, and k is the number of tracks between writing beams. For FIG. 7, the beams are writing to adjacent tracks, so k=1; whereas in FIG. 8 the writing beams are writing to every other track, so k=2. Additional arrangements of the writing beams may be used, such as two-dimensional arrays of writing beams, as long as sufficient spacing is maintained between adjacent writing beams.

An optical disk drive for writing to multiple track of an optical disk is therefore, provided. While preferred illustrative embodiments of the present invention are described above, it will be evident to one skilled in the art that various changes and modifications may be made without departing from the invention. For example, systems employing different numbers of reading or writing beams, or having somewhat different arrangement of lenses could be constructed. It will therefore be understood that illustrative embodiments are provided for purposes of illustration and not limitation, and that the present invention is limited only by the appended claims.

What is claimed is:

1. A method of simultaneously writing data to a plurality of tracks of an optical disk, the method comprising:

providing a plurality of writing laser beams;

modulating the writing laser beams according to the data to be written to the corresponding tracks of the optical disk; and providing an optical system for directing the laser beams to the corresponding tracks of the optical disk, wherein the plurality of laser beams illuminate spots on the optical disk that are spaced apart by a distance sufficient to prevent thermal interference between data marks being written by nearby beams of the plurality of writing laser beams, wherein the plurality of spots are aligned linearly at an angle to the tangent of the data tracks of the optical disk, and wherein the angle between the line of spots and the tangent is determined by $$\sin\alpha = k\frac{p}{d}$$

wherein α is the angle, p is the track pitch of the optical disk, d is the minimum distance between writing spots, and k is the difference in track numbers between the tracks being written.

2. The method of claim 1, wherein the distance between spots on the optical disk is minimized to reduce aberrations in the plurality of laser beams.

3. The method of claim 1 wherein the distance between spots is determined by the thermal characteristics of the optical disk.

4. The method of claim 1 wherein the distance between spots is determined by a temperature profile within the disk during a write operation.

5. The method of claim 1 wherein the distance between writing spots is greater than or equal to about 3.8 $\mu$m.

6. The method of claim 1 wherein the optical disk is a CD-type disk and the angle is about 25 degrees.

7. The method of claim 1 wherein the optical disk is a DVD-type disk and the angle is about 11 degrees.

8. Apparatus for simultaneously writing multiple tracks of an optical disk, the apparatus comprising:

a plurality of laser diodes which produce a corresponding plurality of writing laser beams;

a processor coupled to the plurality of laser diodes, the processor modulating the writing beams responsive to data being written to tracks of the optical disk; and an optical system disposed between the laser diodes and the optical disk, the optical system focusing laser beams on, and aligning the laser beams with, corresponding tracks of the optical disk;

wherein each one of the plurality of writing beams produces a writing spot on the optical disk, and wherein adjacent writing spots are spaced apart to prevent thermal interference between data written to the optical disk by adjacent writing spots, wherein the plurality of spots are aligned linearly at an angle to the tangent of the data tracks of the optical disk, and wherein the angle between the line of spots and the tangent is determined by $$\sin\alpha = k\frac{p}{d}$$

wherein α is the angle, p is the track pitch of the optical disk, d is the minimum distance between writing spots, and k is the difference in track numbers between the tracks being written.

9. The apparatus of claim 8 wherein the distance between spots is determined by the thermal characteristics of the optical disk.

10. The apparatus of claim 8 wherein the distance between spots is determined by a temperature profile within the disk during a write operation.

11. The apparatus of claim 8 wherein the distance between writing spots is greater than or equal to about 3.8 $\mu$m.

12. The apparatus of claim 8 wherein the optical disk is a CD-type disk and the angle is about 25 degrees.

13. The apparatus of claim 8 wherein the optical disk is a DVD-type disk and the angle is about 11 degrees.

* * * * *